United States Patent
Wellington

(10) Patent No.: US 9,749,917 B2
(45) Date of Patent: Aug. 29, 2017

(54) CELLULAR IDENTIFIER OPTIMIZATIONS

(71) Applicant: Eden Rock Communications, LLC, Bothell, WA (US)

(72) Inventor: Daniel Wellington, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 7 days.

(21) Appl. No.: 14/799,499

(22) Filed: Jul. 14, 2015

(65) Prior Publication Data

US 2016/0014651 A1 Jan. 14, 2016

Related U.S. Application Data

(60) Provisional application No. 62/024,377, filed on Jul. 14, 2014.

(51) Int. Cl.
*H04W 36/00* (2009.01)
*H04W 76/02* (2009.01)
*H04W 24/02* (2009.01)

(52) U.S. Cl.
CPC ..... *H04W 36/0083* (2013.01); *H04W 76/021* (2013.01); *H04W 24/02* (2013.01)

(58) Field of Classification Search
CPC ..... H04W 36/30; H04W 80/04; H04W 84/12; H04W 36/0083; H04W 76/021; H04W 36/0061; H04W 36/0016; H04B 1/1027; H04L 41/12; H04L 45/02
USPC ........ 455/436, 501; 370/254, 331, 255, 328, 370/338
See application file for complete search history.

(56) References Cited

U.S. PATENT DOCUMENTS

| | | | |
|---|---|---|---|
| 6,285,874 B1 * | 9/2001 | Magnusson | H04W 16/00 455/423 |
| 2003/0067892 A1 | 4/2003 | Beyer et al. | |
| 2009/0023464 A1 | 1/2009 | Prakash et al. | |
| 2009/0129291 A1 * | 5/2009 | Gupta | H04W 8/26 370/254 |
| 2010/0069072 A1 | 3/2010 | Gogic et al. | |
| 2011/0128890 A1 | 6/2011 | Schein et al. | |
| 2014/0029521 A1 * | 1/2014 | Puthenpura | H04L 5/0053 370/329 |
| 2014/0105122 A1 * | 4/2014 | Zhang | H04W 16/06 370/329 |
| 2014/0329528 A1 * | 11/2014 | Zhao | H04W 36/30 455/436 |

OTHER PUBLICATIONS

International Search Report and Written Opinion for PCT/US2015/040447, dated Oct. 30, 2015.

* cited by examiner

*Primary Examiner* — Olumide T Ajibade Akonai
*Assistant Examiner* — Alexander Yi

(57) ABSTRACT

A method for a cellular telecommunications network includes selecting a plurality of cells, retrieving neighbor lists for the plurality of cells, determining neighbor collisions from the neighbor lists, and changing an identifier for a first cell of the plurality of cells based on a portion of the neighbor collisions that are associated with the first cell. A collision may occur when a same non-unique identifier appears within a certain number of neighbor relationships, such as a neighbor of a neighbor or a neighbor of a neighbor of a neighbor.

16 Claims, 7 Drawing Sheets

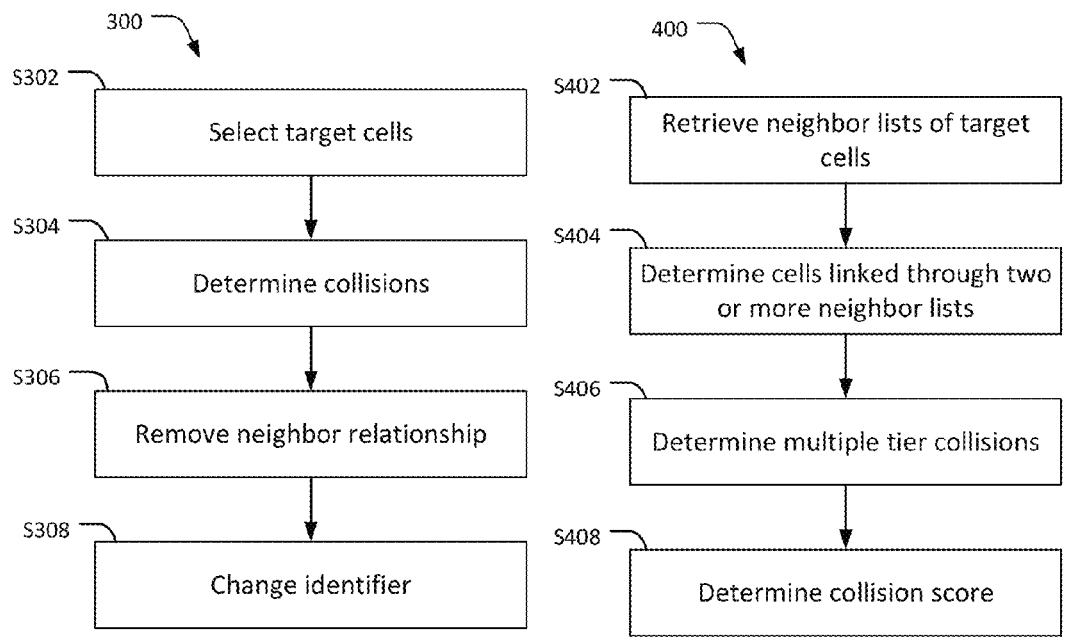

CELLULAR IDENTIFIER OPTIMIZATIONS

CROSS-REFERENCES TO RELATED APPLICATIONS

The present disclosure claims priority to U.S. Provisional Application No. 62/024,377, filed Jul. 14, 2014, which is incorporated by reference herein for all purposes.

BACKGROUND

In 3G and Long Term Evolution (LTE), a great deal of care is taken in planning scrambling codes for 3G and for planning Scrambling Codes (SC) and Physical Cell Identities (PCI) for cellular networks. SCs and PCIs are non-unique identifier codes for cells in a telecommunications network. There are 512 primary SCs available for 3G and 504 PCIs available for LTE. The limited number PCIs and scrambling codes are reused in a network, and network planners attempt to maximize the distance between cells that use the same PCIs.

When cells with the same PCI are close to one another, network entities that rely on the PCIs to identify cells may confuse the cells with one another. Such an event is referred to here as a scrambling code or PCI conflict. Conflicts can result in degraded performance that manifests through handover failures and ghosting, which is a form of false detection. Both of these problems lead to elevated dropped call rates.

In most networks around the world, groups of codes are allocated so that physical distance is the primary value used to distribute PCIs in a reuse scheme. When engineers typically implement reuse of PCIs, codes are not re-allocated until some distance away.

Conventional approaches often fail in several respects. First, with coastal markets, those with large bodies of water, and markets with highly varied terrain, distance is not as effective for minimizing identifier conflicts. For example, when two cells are separated by a substantial body of water, signals from those cells may experience a high level of conflicts despite being relatively far apart from one another.

Second, in relatively dense markets with urban canyons and vertical layering, distances used for lower density urban and suburban settings can lead to anomalous results. Variations in cell density compromise the efficacy of distance-based reuse planning.

Third, with markets that are adding many frequency layers, it becomes difficult to find available identifiers and maintain an effective plan. There are often tens of thousands of cells in a network. This is difficult to manage, and mistakes occur. Many ad-hoc changes happen in a network, which further complicates matters.

BRIEF SUMMARY

Embodiments of this disclosure may use non-unique cell identifier code collisions to determine qualities of an identifier reuse plan. In addition, embodiments may be implemented to establish a reuse plan that minimizes non-unique cell identifier code collisions, and therefore improves overall network quality by reducing errors associated with identifier conflicts.

In an embodiment, a method for a cellular telecommunications network includes selecting a plurality of cells, retrieving neighbor lists for the plurality of cells, determining neighbor collisions from the neighbor lists, and changing an identifier for a first cell of the plurality of cells based on a portion of the neighbor collisions that are associated with the first cell. The method may further include determining second, third and fourth tier neighbor collisions from the neighbor lists.

In an embodiment, the second, third and fourth tier neighbor collisions are differentiated from one another by a number of neighbor relationships linking two cells that share a same identifier. A neighbor collision may be present when the identifier for the first cell is used to represent a second cell that appears on a neighbor list of a cell on a neighbor list of the first cell. Moreover, determining neighbor collisions may include identifying two cells that share a same identifier and are linked through at least two separate neighbor lists.

Changing an identifier for a cell may include selecting a plurality of candidate identifiers that are not present on neighbor lists linking two cells in a second tier neighbor collision, and testing the plurality of candidate identifiers to determine an optimum identifier. In addition, a telecommunications method may include sorting the plurality of candidate identifiers by distances between a cell whose identifier is being replaced and a nearest cell with each candidate replacement identifier. The distance value may be a modified distance value that is modified by an azimuth of the cell whose identifier is being replaced.

In an embodiment, the method includes sorting the plurality of cells by collisions associated with the plurality of cells. The collisions associated with the cells may be second, third and fourth tier collisions. The second tier collisions may be weighted more than the third tier collisions, and the third tier collisions may be weighted more than the fourth tier collisions.

In an embodiment, determining neighbor collisions includes determining a first plurality of neighbors from a neighbor list of the first cell, determining a second plurality of neighbors from neighbor lists of the first plurality of neighbors, and determining a same identifier that is shared by the first cell and a second cell of the second plurality of neighbors, wherein recurrence of the same identifier at the first cell and the second cell is a second tier collision.

Determining neighbor collisions may include determining neighbors of neighbors and determining neighbors of neighbors of neighbors. A neighbor entry may be removed for a neighbor relationship of a cell involved in one of the second, third or fourth tier neighbor collisions.

BRIEF DESCRIPTION OF THE DRAWINGS

FIG. 3 illustrates an embodiment of optimizing cell identifiers.

FIG. 4 illustrates an embodiment of determining identifier collisions.

DETAILED DESCRIPTION

Figure 1:
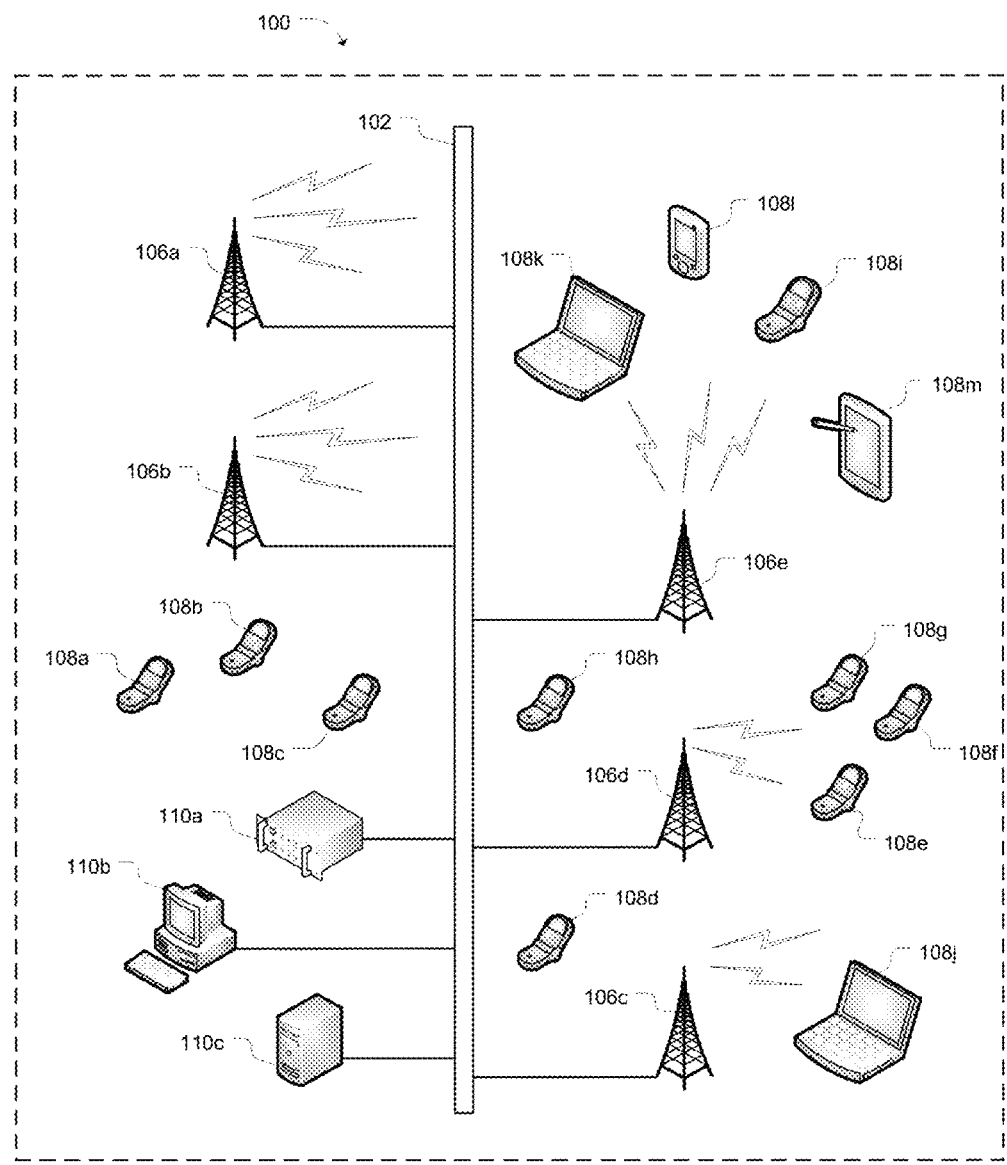
FIG. 1 illustrates an embodiment of a telecommunications network.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

Elements of this disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of this disclosure.

Embodiments of the present disclosure relate to optimizing a cellular telecommunications network. In particular, network optimizations can be achieved by changing non-unique cellular identifiers or altering neighbor relations. The distribution of non-unique cellular identifiers through a conventional network is based on distance, which is an imperfect variable for optimizing the distribution of identifiers.

Even when cellular identifiers are well distributed when a network is initially deployed, changing conditions may result in degraded performance so that the distribution is no longer optimal. For example, femtocells may be installed by users, and non-unique identifiers may be assigned to the femtocells with minimal regard for the original distribution plan. In another example, large structures may be erected in an urban area which changes neighbor relations without necessarily updating the distribution of non-unique identifiers. Accordingly, networks can benefit from a method and system that identifies sub-optimal distribution of non-unique cell identifiers and improves the distribution in a configurable fashion.

In accordance with an embodiment of the present disclosure, FIG. 1 illustrates a networked computing system 100 including various wired and wireless computing devices that may be utilized to implement the identifier optimization processes associated with various embodiments.

A networked computing system 100 may include a group of service provider controller devices 110*a-c*, any of which may be Network Resource Controllers (NRCs) or have NRC functionality; network base stations 106*a-e*, any of which may be NRCs or have NRC functionality, that may share overlapping wireless coverage with one or more neighboring base stations within a particular region of the networked computing system 100; multiple UE including: cell phone/PDA devices 108*a-i*, laptop/netbook computers 108*a-b*, handheld gaming units 108*l*, electronic book devices or tablet PCs 108*m*, and any other type of common portable wireless computing device that may be provided with wireless communications service by any of the network base stations 106*a-e*; and a backhaul portion that can facilitate distributed network communications between any of the network controller devices 110*a-c* and any of the network base stations 106*a-e*.

As would be understood by those skilled in the Art, in most digital communications networks, the backhaul portion 102 of a data communications network may include intermediate links between a backbone of the network which are generally wireline, and sub networks or network base stations 106*a-e* located at the periphery of the network. For example, cellular user equipment communicating with one or more network base stations 106*a-e* may constitute a local sub network. The network connection between any of the network base stations 106*a-e* and the rest of the world may initiate with a link to the backhaul portion of an access provider's communications network (e.g., via a point of presence).

A Network Resource Controller (NRC) is a physical entity that may include software components. An NRC may facilitate all or part of the identifier optimization processes associated with various embodiments of the present disclosure. In accordance with an embodiment, an NRC that performs a particular process may be a physical device, such as a network controller device 110*a-c* or a network base station 106*a-e*. In yet another embodiment, an NRC that performs a particular process may be a logical software-based entity that can be stored in the volatile or non-volatile memory or memories, or more generally in a non-transitory computer readable medium, of a physical device such as a network controller device 110*a-c*, or a network base station 106*a-e*.

In accordance with various embodiments of the present disclosure, the NRC has presence and functionality that may be defined by the processes it is capable of carrying out. Accordingly, entity that is the NRC may be generally defined by its role in performing processes associated with this disclosure. Therefore, depending on the particular embodiment, the NRC entity may be considered to be either a physical device, and/or a software component that is stored in the computer readable media such as volatile or non-volatile memories of one or more communicating device(s) within a networked computing system 100. In an embodiment, any of the service provider controller devices 110*a-c*, and/or network base stations 106*a-e* (optionally having NRC functionality or considered to be a NRC) may function independently or collaboratively to implement processes associated with various embodiments of the present disclosure.

In accordance with a standard GSM network, any of the service provider controller devices 110*a-c* (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the service provider controller devices 110*a-c* (optionally having NRC functionality) may be associated with a network resource controller (NRC), a serving GPRS support node (SGSN), or any other common service provider controller device known in the art, such as an RRM. In accordance with a standard LTE network, any of the service provider controller devices 110*a-c* (optionally having NRC functionality) may be associated with an eNodeB base station, a mobility management entity (MME), or any other common service provider controller device known in the art, such as an RRM.

In an embodiment, any of the service provider controller devices 110*a-c*, the network base stations 106*a-e*, as well as any of the user equipment 108 may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. In an embodiment, any of the service provider controller devices 110*a-c* or any of the network base stations 106*a-e* may employ any number of common server, desktop, laptop, and personal computing devices.

In an embodiment, any of the user equipment 108 may be associated with any combination of common mobile computing devices (e.g., laptop computers, netbook computers, tablet computers, cellular phones, PDAs, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network of FIG. 1 may employ any of the following common communications technologies: optical fiber, coaxial cable, twisted pair cable, Ethernet cable, and powerline cable, along with any other wireless communication technology known in the art. In an embodiment, any of the service provider controller devices 110a-c, the network base stations 106a-e, and user equipment 108 may include any standard computing software and hardware necessary for processing, storing, and communicating data between each other within the networked computing system 100. The computing hardware realized by any of the network computing system 100 devices may include one or more processors, volatile and non-volatile memories, user interfaces, transcoders, modems, wireline and/or wireless communications transceivers, etc.

Further, any of the networked computing system 100 devices may include one or more computer readable media encoded with a set of computer readable instructions, which when executed, can perform a portion of processes associated with various embodiments of the present disclosure. In context with various embodiments, it should be understood that wireless communications coverage associated with various data communication technologies (e.g., network base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
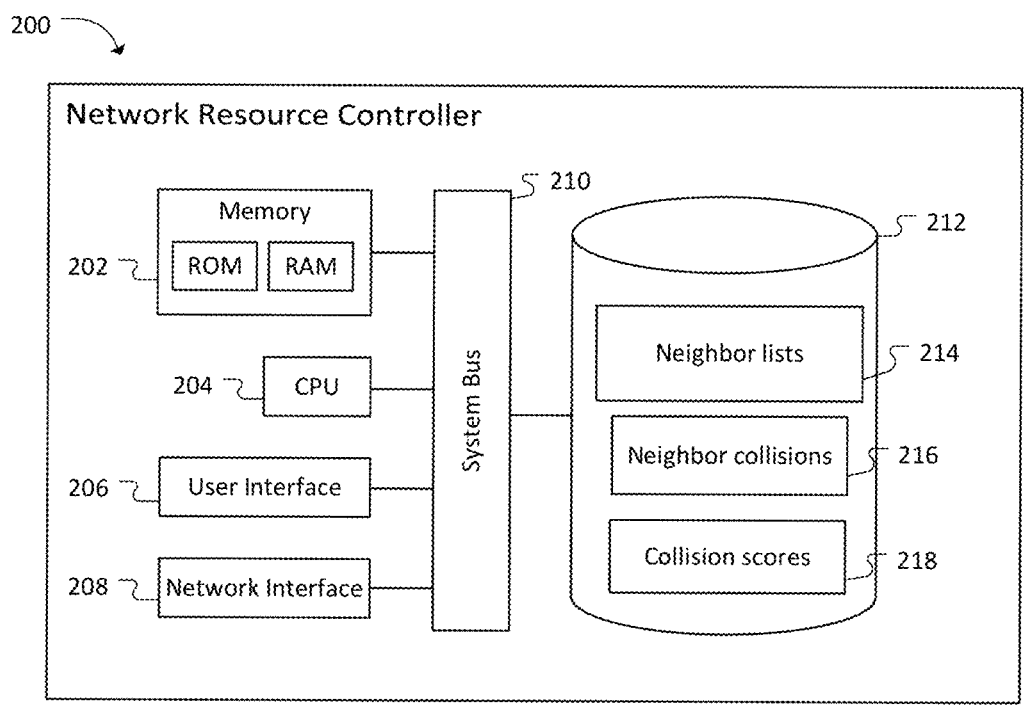
FIG. 2 illustrates an embodiment of a computer networking device.

FIG. 2 illustrates a block diagram view of an NRC 200 that may be representative of any of the network base stations 106a-e or any of the network controller devices 110a-c depicted in FIG. 1. In accordance with an embodiment of the present disclosure, the NRC 200 may be associated with any common base station or network controller device known in the Art, such as an LTE eNodeB (optionally comprising a wireless modem), RRM, MME, RNC, SGSN, BSC, MSC, etc. The NRC 200 may include one or more data processing device including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then execute and/or processes them, calling on the ALU when necessary during program execution. The CPU 204 may be responsible for executing all computer programs stored on the NRC's volatile (RAM) and non-volatile (e.g., ROM) system memories 202 and storage 212. Storage 212 may comprise volatile or non-volatile memory such as RAM, ROM, a solid state drive (SSD), SDRAM, or other optical, magnetic, or semiconductor memory.

The NRC 200 may also include a network interface/optional user interface component 306 that can facilitate communication with the backhaul portion or the wireless portions of the data communications network 100 of FIG. 1, and may facilitate a user or network administrator accessing the NRC's 200 hardware and/or software resources. A storage 212 may store neighbor lists 212, neighbor collisions 216, and collision scores 218 in accordance with an embodiment of this disclosure.

FIG. 3 illustrates a process 300 of optimizing cell identifiers according to an embodiment of this disclosure. Target cells are selected at S302. The target cells that are selected may be defined by a geographical region, a political boundary, or another division of base stations in a network. Alternatively, every cell in a network can be selected as a target cell for optimization process 300.

Collisions are determined at S304. Determining collisions may include determining a quantity and type of collisions between base stations by analyzing neighbor lists for neighboring cells. For example, determining collisions S304 may include determining recurrences of non-unique cellular identifiers for a neighbor of a neighbor of a cell with the same identifier. Determining collisions S304 may include determining one or more of second, third and fourth tier collisions.

A neighbor relationship is removed at S306. Removing the neighbor relationship may include removing a neighbor from a neighbor list of a cell involved with a neighbor collision. In particular, the collision may be a second, third or fourth tier collision. The particular neighbor entry that is removed may be removed based on a distance and azimuth value of the cell on whose neighbor list it appears, and the neighbor entry may be blacklisted after removal.

An identifier that causes a neighbor collision is changed at S308. The identifier may be replaced with an identifier that has been selected from a plurality of candidate replacement identifiers based on one or more selection criteria such as distance and azimuth. The replaced identifier may be tested before or after committing the change, and the identifier may be replaced by a second identifier depending on a result of the test.

Elements of process 300 will now be described in further detail in the context of FIGS. 4 to 7.

FIG. 4 shows an embodiment of a process 400 for determining collisions. Collisions are classified according to tiers, which are in turn determined by analyzing neighbor lists. Accordingly, S402 of process 400 is retrieving neighbor lists of target cells. In an embodiment, the neighbor lists of the target cells selected at S302 are retrieved by a network entity such as a SON server, a Radio Resource Manager, or another network entity. The neighbor lists may be transmitted from the base stations, or stored at a central location.

Neighbors of neighbors are determined at S404. To determine a neighbor of a neighbor, a neighbor list of a first cell is retrieved, and a neighbor list for each cell on the neighbor list of the first cell is retrieved. Each neighbor that appears on neighbor lists of neighbors of the first cell is a neighbor of a neighbor.

Put another way, the cells on the neighbor list of the first cell may be referred to as second cells. Cells that are on the neighbor list of the second cells are neighbors of neighbors of the first cell. The second cells may be target cells, in which case their neighbor lists are available from performing S402. If not, the neighbor lists of the second cells can be retrieved when S404 is performed. In the even that actual neighbor lists are not available when process 400 is performed, substitute neighbor lists could be generated using a planning tool.

The process is repeated again to determine neighbors of neighbors of neighbors. In an embodiment, each cell on neighbor lists of the second cells is a third cell, and cells that are on the neighbor lists of the third cells are neighbors of neighbors of neighbors of the first cell. This process may repeat until sufficient neighbor relationships are analyzed to determine fourth tier collisions in a network.

An identifier collision is present when the same non-unique identifier is used by two cells that are connected through separate neighbor relationships. The neighbor relationships may be either inbound or outbound neighbor relationships.

Figure 5A:
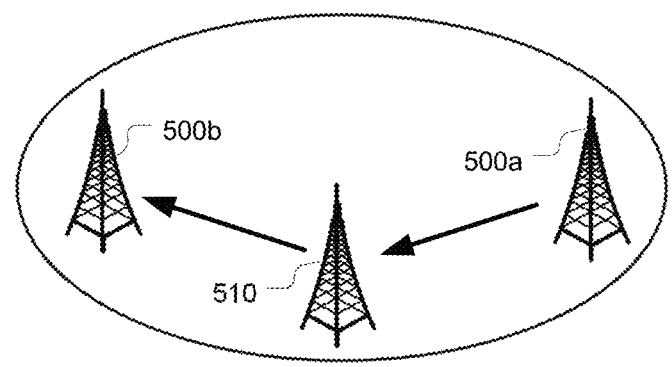
FIGS. 5A-5D show examples of second, third and fourth tier collisions.

FIGS. 5A to 5D illustrate several different collision scenarios. FIG. 5A shows a first base station 500a that shares the same non-unique identifier with base station 500b. Although a base station may serve several different cells with different identifiers, the base stations of FIG. 5A to 5D each represent a single cell. Accordingly, subsequent description of these figures will refer to cells 500a, 500b, etc.

In the scenario of FIG. 5A, cell 510 is an outbound neighbor of cell 500a, so that cell 510 appears on the neighbor list of cell 500a. Similarly, cell 500b appears on the neighbor list of cell 510, so cell 500b is an outbound neighbor of cell 510, and cell 510 is an inbound neighbor of cell 500b.

FIG. 5A shows a second tier collision between cells 500a and 500b. Cell 500a is linked to cell 500b through two neighbor relationships (cell 500a to cell 510, and cell 510 to cell 500a).

If cell 500a and cell 500b were both outbound neighbors of cell 510, the relationship between cell 500a and cell 500b would be a first tier collision. In such a scenario, both cells with the same identifier would appear on the same neighbor list of cell 510. However, such a scenario is unlikely to exist in an active network. Because first tier collisions are easy to detect and prevent, most networks do not allow them to occur. According, first tier collisions may not be considered by embodiments of this disclosure.

However, if cell 510 is an inbound neighbor of both cell 500a and cell 500b and both of the cells 500a and 500b do not appear on the neighbor list of cell 510, then FIG. 5A would still represent a second tier collision. Therefore, the tier ranking value can be described as the number of neighbor links between two cells that share the same unique identifier and do not appear on the same neighbor list.

Figure 5B:
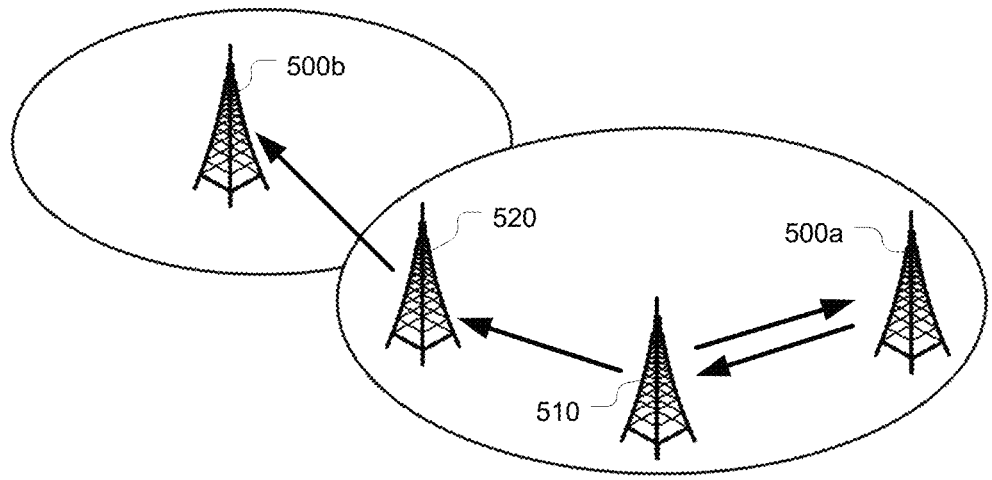

FIG. 5B illustrates a third tier collision between cells 500a and 500b which share the same identifier. Cells 510 and 520 are neighbor links between the colliding cells. FIG. 5B shows two directions of neighbor links between cell 510 and cell 500a, and either scenario results in a third tier collision. Thus, the directionality of the neighbor link is relevant to the tier count when both cells with the same identifier appear on the same neighbor list, but directionality does not impact the way tiers are counted in other scenarios. The tier ranking value may be described as n−1, where n is the number of cells involved in the collision.

Figure 5C:
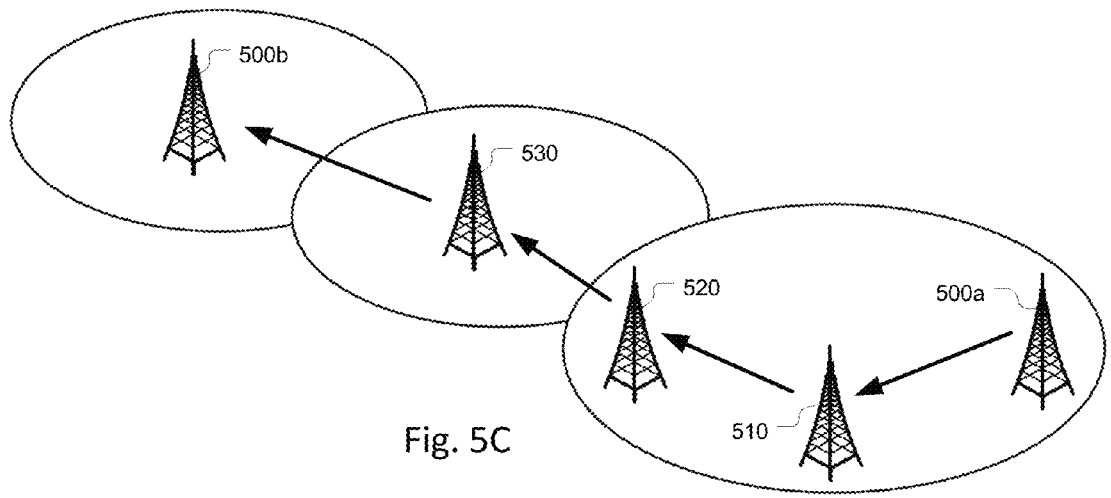
Figure 5D:
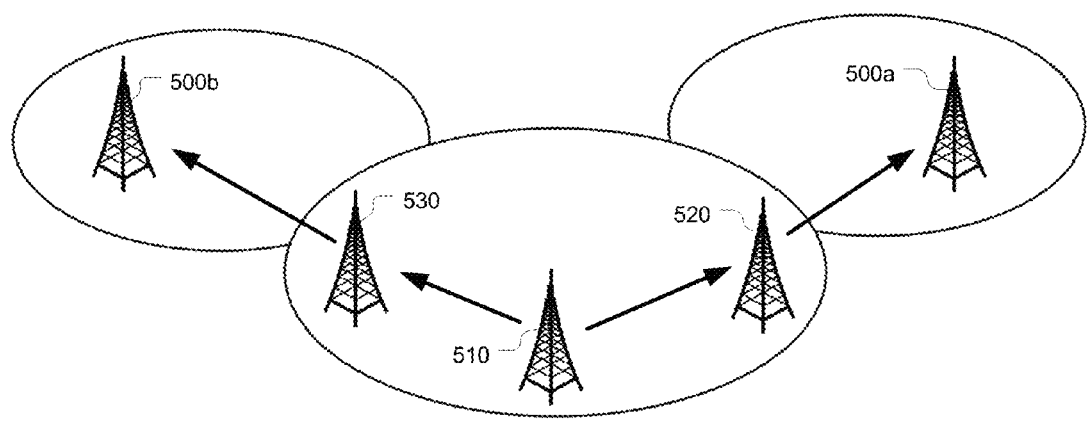

FIG. 5C shows a fourth tier collision between cells 500a and 500b with the same identifier. In FIG. 5C, all of the links between cell 500a and cell 500b are in the same direction. In contrast, FIG. 5D shows another fourth tier collision between cells 500a and 500b, but the neighbor links are outbound neighbors from origin cell 510.

It should be appreciated that FIGS. 5A to 5D do not show every possible second, third and fourth tier collision. Rather, they are provided to illustrate some of the characteristics of second, third and fourth tier collisions. Other permutations of inbound and outbound relationships are possible.

Returning to FIG. 4, multiple tiers of collisions are determined at S406, including the second, third and fourth tier collisions discussed above with respect to FIGS. 5A to 5D. Determining tiers S406 can be accomplished by selecting a source cell in a network and analyzing the inbound and outbound neighbor relationships for the source cell. The source cell may or may not be a cell whose non-unique identifier is identified. For example, turning to FIG. 5D, cell 510 may be the source cell, and analysis of neighbor relationships in which cell 510 is a link reveals colliding cells 500a and 500b.

A collision score is determined at S408. The collision score for a given cell may be established according to the number of second, third and fourth tier collisions in which the given cell's identifier is repeated. The collision score may be calculated in various ways in various embodiments. In an embodiment, fourth tier collisions may not be determined or used to calculate the collision score.

In determining a collision score, the collisions may be weighted for each cell according to tier type. For example, in an embodiment, second tier collisions are given a highest weight, third tier are weighted less than second tier, and fourth tier collisions are weighted less than third tier collisions. In a specific example, fourth tier collisions are not multiplied by a weight, third tier collisions are weighted by a factor of 2, and second tier collisions are weighted by a factor of 5. Thus, a cell that has one second tier collision, one third tier collision and one fourth tier collision would have a weighted collision score of 8, while a cell with two fourth tier collisions and two third tier collisions would have a weighted score of 6. In this example, the cell with the weighted score of 8 is sorted above the cell with the weighted score of 6.

Figure 6:
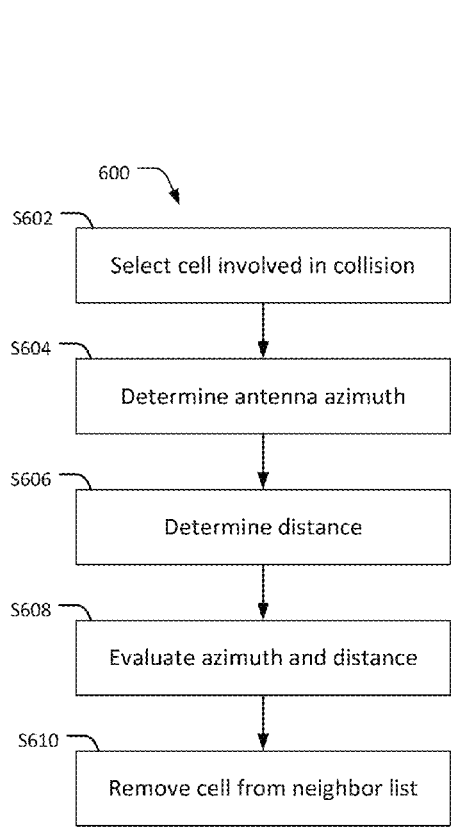
FIG. 6 illustrates an embodiment of changing a cell value by removing a neighbor.

FIG. 6 shows a process 600 of removing a neighbor relationship. FIG. 6 is an embodiment of S306 described above.

Process 600 may be performed for each cell involved in a second, third or fourth tier collision, or for some portion of cells involved in such collisions. Accordingly, a cell that is involved in a collision is selected at S602. A cell that is involved in a collision may be any cell in the link of neighbors between cells that share the same identifier. For example, in FIG. 5D which shows a fourth tier collision, any of cells 500a, 500b, 510, 520 or 530 are selected.

An antenna azimuth for each cell involved in a collision is determined at S604. The antenna azimuth may be a specific angle or direction. In an embodiment, the azimuth may be expressed as a sector, or degrees of arc.

An azimuth is determined for each cell whose neighbor list is involved in a collision. For example, in the fourth tier collision shown in FIG. 5D, an azimuth may be determined for cells 510, 520 and 530. In an embodiment, the azimuth of every target cell, which may be every cell in a network, is determined For example, in the embodiment of FIG. 5D, cell 520 is on the neighbor list of cell 510, and both cell 520 and cell 510 are involved in a fourth tier collision. In this scenario, S604 will determine the azimuth of the antenna for cell 510, and the distance between cell 510 and cell 520 is determined at S606.

The azimuth and/or distance values are evaluated at S608. In one specific example using the cells in FIG. 5D, S608 determines whether cell 520 lies within a sector of plus or minus 45 degrees of the azimuth of cell 510, and whether cell B is less than one kilometer from cell A. If either of these criteria is satisfied, the neighbor link is retained. Although this example determines whether either criteria is satisfied to retain the neighbor relationship, another embodiment may determine whether both criteria are satisfied.

In other embodiments, there may be a more complex set of criteria to determine whether to maintain or remove a neighbor relationship. A specific, non-limiting example is illustrated by FIG. 7, which will now be explained to help understand an embodiment of evaluating cell characteristics S608.

Figure 7:
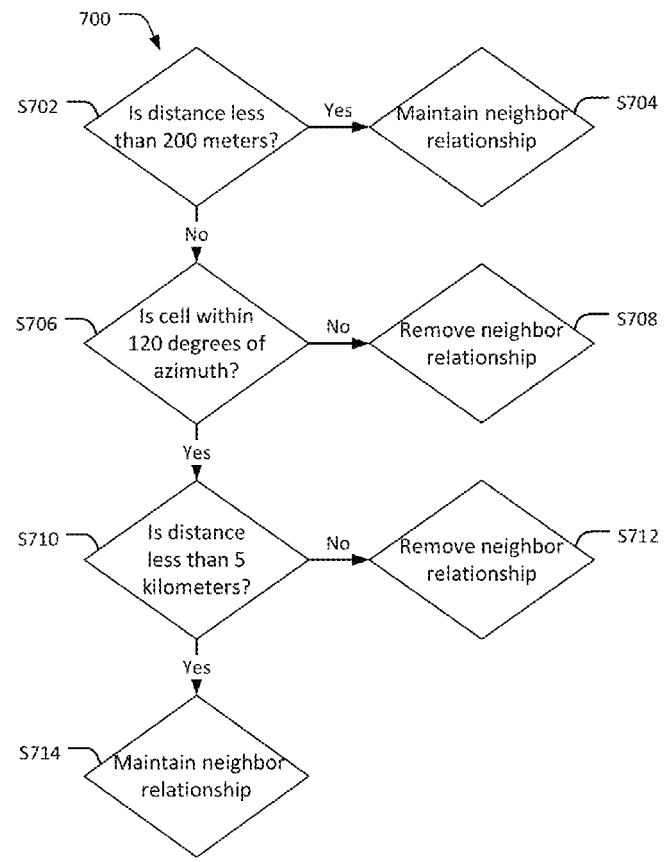
FIG. 7 illustrates an embodiment of evaluating cell characteristics to determine whether to remove a neighbor relationship.

In FIG. 7, a process 700 of evaluating cell characteristics first determines whether the distance between cells is less than some threshold value of 200 meters. If it is less, then the link is maintained at S704 because the cells are so close to one another that they are valid neighbors regardless of azimuth and the process is terminated. However, if the distance is greater than 200 meters, azimuth is evaluated at S706.

In the specific example of FIG. 7, azimuth is evaluated by determining whether the neighbor cell is within 120 degrees of azimuth of the target cell on whose neighbor list the neighbor cell appears. When the neighbor cell is not within 120 degrees of azimuth, the neighbor relationship is removed at S708.

Distance is evaluated at S710 by comparing to a threshold value, which is 5 kilometers in the example of FIG. 7. If the distance is greater than the threshold value, the neighbor relationship is removed at S712. If the distance is less than the threshold value, then the neighbor relationship is maintained, and another cell is evaluated. It should be appreciated that FIG. 7 is merely an example that is provided to help illustrate evaluating cell characteristics to determine whether to remove a neighbor relationship.

When the azimuth and/or distance criteria fail, the neighbor relationship may be removed at S610. In an embodiment, removing the neighbor relationship includes removing the entry of the neighbor cell from the neighbor list and replacing it with some other cell. In addition, removing the neighbor S610 may include blacklisting the neighbor from the neighbor list from which it is removed, so that subsequent operations do not return the cell to the neighbor list.

Although embodiments have been described using distance and/or azimuth, the scope of this disclosure is not so limited. In other embodiments, other cell characteristics may be used to evaluate whether a neighbor relationship should be removed. For example, other embodiments may evaluate characteristics such as downtilt and transmit power. In addition, evaluating the cell characteristics may include comparing one or more cell characteristics to a plurality of threshold values, and evaluating characteristics in series or in parallel to determine whether to remove a neighbor link.

Figure 8:
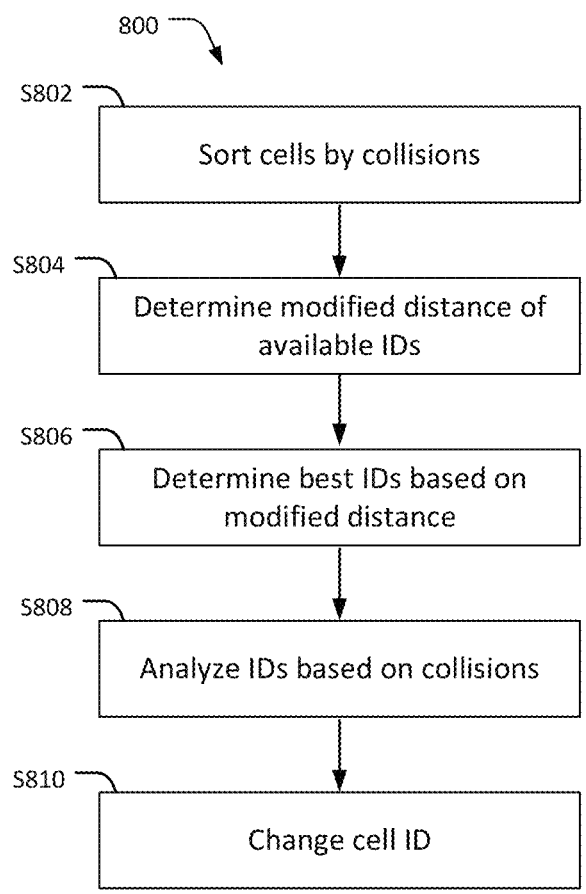
FIG. 8 illustrates an embodiment of changing a cell identifier.

FIG. 8 shows an embodiment of a process 800 of changing a cell identifier. Process 800 is an embodiment of changing an identifier S308.

A plurality of cells are sorted by collisions at S802. In an embodiment, each cell of a plurality of cells is analyzed to determine the number of second, third and fourth tier collisions that result from its identifier. In other words, each cell is evaluated to determine whether its non-unique identifier collides with a same non-unique identifier as described with respect to FIGS. 4 and 5 of this disclosure. In an embodiment, the sorting criteria is the collision score determined at S408 as described above.

A modified distance for available identifiers is determined at S804. Available identifiers may be determined by finding identifiers that are not in use within a certain distance of the cell whose identifier is being changed. For example, an embodiment may determine that 100 non-unique identifiers are not in use within 10 kilometers of a target cell. These 100 identifiers are the available IDs.

Next, a modified distance value may be determined for each of the available IDs. In an embodiment, the modified distance value is a distance value that is modified by accounting for the azimuth of the target cell whose identifier is being replaced.

Determining modified distance may be accomplished in various ways in specific embodiments. For example, the azimuth may be broken into sectors of a circle, and a value may be assigned to each sector of the circle. In one specific example, the distance to the closest cell that uses an available identifier is determined. Next, the direction to that cell is determined, and the direction to the cell is compared to the azimuth of the target cell antenna. In an embodiment that uses 4 sectors, the distance to the cell is multiplied by a first value when it is +/−45 degrees from the antenna azimuth, multiplied by a second value larger than the first value when the cell is +/−45-135 degrees from the target cell, and multiplied by a third value higher than the second value when the cell is +/−135 to 180 degrees from the target cell. In such an embodiment, the identifier with the highest modified distance value is selected to replace the identifier of the target cell at S806. Thus, embodiments may consider both distance and pointing direction to select an optimal replacement identifier for the target cell.

However, even when distance and azimuth are both considered to select a new identifier at S806, the new identifier may not be the best possible identifier to minimize identifier collisions in the network. Accordingly, an embodiment may test the identifier at S808 by counting the number of collisions that would result from using the new identifier. In an embodiment, determining the best identifiers at S806 includes identifying a specific number of identifiers with the highest modified distance scores for analysis. For example, the 10, 25 or 50 identifiers with the highest modified distance values may be selected for testing.

In such an embodiment, analyzing identifiers S808 may be performed in a manner similar to the embodiments described with respect to FIG. 4 above. The collisions may be weighted according to the tier of collision and a collision score may be calculated for each identifier as described above with respect to S802. In another embodiment, a number of one or more of second, third and fourth tier collisions are determined for a candidate replacement identifier, and compared to a threshold value. If the number of collisions exceeds the threshold value, the candidate is disregarded and a new candidate is selected and analyzed. A collision score as explained with respect to S408 may be used to analyze the IDs. In an embodiment, S808 may be an alternative to S806.

The cell identifier may be changed at S810. In an embodiment, an identifier change is recommended to a central network entity, and the central network entity pushes the identifier change to the network. Changing the identifier may include changing identifier values in memories of multiple network elements including base stations, user equipment, and various hardware elements that maintain neighbor information. Changing the identifier may include transmitting a signal from a central network entity over a wireline connection of a backhaul portion of a network to a base station. The base station may update neighbor list information in accordance with the signal, and wirelessly transmit the updated neighbor list to user equipment in the network. The user equipment may then store the new neighbor list information. The updated neighbor list information may be used to execute handover operations to the newly updated cell.

Optimizations described by this disclosure may be performed on demand or periodically. Various elements of the processes may be performed several times consecutively to optimize identifiers in a network. Because updating neighbor lists will affect the number of collisions present across a network, analyzing each cell in the network only one time for collisions may cause additional collisions. Analyzing the cells and updating identifiers a second time may result in additional improvements. However, the impact of changing identifiers decreases for consecutive iterations. Therefore, in an embodiment, an optimization process may be performed a limited number of times or until improvements are no longer substantial.

Embodiments of the present disclosure are improvements to conventional telecommunications technology. The inventors have discovered that network performance is substantially improved when implementing embodiments illustrated by this disclosure and as presented in the following claims.

What is claimed is:

1. A method for a cellular telecommunications network, the method comprising:
    selecting a plurality of cells served by a plurality of base stations;
    retrieving neighbor lists for the plurality of cells;
    determining neighbor collisions for the plurality of cells from the neighbor lists;
    sorting the plurality of cells by the neighbor collisions; and
    changing an identifier for a first cell of the plurality of cells based on a portion of the neighbor collisions that are associated with the first cell,
    wherein, changing the identifier for the cell includes:
    selecting a plurality of candidate identifiers that are not present on neighbor lists linking two cells in a second tier neighbor collision;
    determining respective distance values for the plurality of candidate identifiers;
    testing the plurality of candidate identifiers by counting the number of collisions that would result from using candidate identifiers with the highest distance values in order to determine an optimum identifier,
    wherein determining neighbor collisions includes:
    determining a first plurality of neighbors from a neighbor list of the first cell;
    determining a second plurality of neighbors from neighbor lists of the first plurality of neighbors; and
    determining a same identifier that is shared by the first cell and a second cell of the second plurality of neighbors, and
    wherein recurrence of the same identifier at the first cell and the second cell is a second tier collision.

2. The method of claim 1, wherein determining the neighbor collisions from the neighbor lists includes:
    determining second, third and fourth tier neighbor collisions from the neighbor lists.

3. The method of claim 2, wherein the second, third and fourth tier neighbor collisions are differentiated from one another by numbers of neighbor relationships linking two cells that share a same identifier.

4. The method of claim 1, wherein a neighbor collision is present when the identifier for the first cell is used to represent a second cell that appears on a neighbor list of a cell on a neighbor list of the first cell.

5. The method of claim 1, wherein determining neighbor collisions includes identifying two cells that share a same identifier and are linked through at least two separate neighbor lists.

6. The method of claim 1, further comprising:
    sorting the plurality of candidate identifiers by distances between a cell whose identifier is being replaced and a nearest cell with each candidate replacement identifier.

7. The method of claim 6, wherein the distance value is a modified distance value that is modified by an azimuth of the cell whose identifier is being replaced.

8. The method of claim 1, wherein the collisions for the plurality of cells are second and third tier collisions.

9. The method of claim 8, wherein the second tier collisions are weighted more than the third tier collisions, and the third tier collisions are weighted more than fourth tier collisions.

10. The method of claim 1, wherein determining neighbor collisions includes determining neighbors of neighbors and determining neighbors of neighbors of neighbors.

11. The method of claim 2, further comprising:
    removing a neighbor entry for a neighbor relationship of a cell involved in one of the second, third or fourth tier neighbor collisions.

12. A cellular telecommunications system comprising:
    a plurality of base stations serving a plurality of selected cells; and
    a network resource controller coupled to the plurality of base stations,
    wherein the network resource controller retrieves neighbor lists for the plurality of cell, determines neighbor collisions for the plurality of cells from the neighbor lists, and sorts the plurality of cells by the neighbor collisions;
    wherein a base station of the plurality of base stations changes an identifier for a first cell of the plurality of cells based on a portion of the neighbor collisions that are associated with the first cell,
    wherein, changing the identifier for the cell includes:
    selecting a plurality of candidate identifiers that are not present on neighbor lists linking two cells in a second tier neighbor collision;
    determining respective distance values for the plurality of candidate identifiers; and
    testing the plurality of candidate identifiers by counting the number of collisions that would result from using candidate identifiers with the highest distance values in order to determine an optimum identifier,
    wherein determining neighbor collisions includes:
    determining a first plurality of neighbors from a neighbor list of the first cell;
    determining a second plurality of neighbors from neighbor lists of the first plurality of neighbors; and
    determining a same identifier that is shared by the first cell and a second cell of the second plurality of neighbors, and
    wherein recurrence of the same identifier at the first cell and the second cell is a second tier collision.

13. The cellular telecommunications system of claim 12, wherein the neighbor collisions are second and third tier collisions.

14. The cellular telecommunications system of claim 12, wherein the second and third tier collisions are differentiated from one another by numbers of neighbor relationships linking two cells that share a same identifier.

15. The cellular telecommunications system of claim 12, wherein the changed identifier for the first cell is not present on neighbor lists linking the first cell with at least one other cell in a second tier neighbor collision.

16. The cellular telecommunications system of claim 12, wherein identifiers of the neighbor collisions are removed from the neighbor lists.

\* \* \* \* \*